United States Patent
Seetharaman et al.

(10) Patent No.: US 9,907,002 B2
(45) Date of Patent: Feb. 27, 2018

(54) NETWORK RESOURCE OPTIMIZATION FOR CONTINUITY OF LAWFUL INTERCEPTION OF VOICE AND DATA SESSIONS ACROSS NETWORKS

(71) Applicant: Wipro Limited, Bangalore (IN)

(72) Inventors: Swaminathan Seetharaman, Chennai (IN); Venkata Subramanian Jayaraman, Chennai (IN)

(73) Assignee: WIPRO LIMITED, Bangalore (IN)

( * ) Notice: Subject to any disclaimer, the term of this patent is extended or adjusted under 35 U.S.C. 154(b) by 273 days.

(21) Appl. No.: 14/826,920

(22) Filed: Aug. 14, 2015

(65) Prior Publication Data
US 2016/0373986 A1 Dec. 22, 2016

(30) Foreign Application Priority Data
Jun. 19, 2015 (IN) .............. 3069/CHE/2015

(51) Int. Cl.
*H04W 36/22* (2009.01)
*H04W 28/02* (2009.01)
(Continued)

(52) U.S. Cl.
CPC .......... *H04W 36/22* (2013.01); *H04W 12/02* (2013.01); *H04W 28/0289* (2013.01); *H04W 36/0011* (2013.01)

(58) Field of Classification Search
CPC . H04W 36/22; H04W 12/02; H04W 28/0289; H04W 36/001
See application file for complete search history.

(56) References Cited

U.S. PATENT DOCUMENTS

| | | | |
|---|---|---|---|
| 8,553,588 B2 | 10/2013 | Jayaraman | |
| 2010/0080127 A1* | 4/2010 | Yin | H04L 47/11 370/235 |

(Continued)

FOREIGN PATENT DOCUMENTS

IN 1716/CHE/2015 4/2015

OTHER PUBLICATIONS

Extended European search report from the European Patent Office for counterpart European Application No. EP 15 20 1797 dated Nov. 2, 2016.

*Primary Examiner* — Sai Aung
(74) *Attorney, Agent, or Firm* — Finnegan, Henderson, Farabow, Garrett & Dunner, LLP (57) ABSTRACT

A lawful interception system to perform operations comprising determining an appropriate session continuity server, a content duplication element associated with a source communication network and one or more communication network properties associated with the source communication network; initiating, duplication of one or more first data packets associated with the ongoing voice and data session by the content duplication element; detecting a handover of the ongoing voice and data session from the source communication network to a destination communication network; determining the content duplication element associated with the destination communication network and one or more communication network properties associated with the destination communication network; and initiating, duplication of one or more second data packets associated with the ongoing voice and data session by the content duplication element.

18 Claims, 4 Drawing Sheets

(51) Int. Cl.
*H04W 12/02* (2009.01)
*H04W 36/00* (2009.01)

(56) References Cited

U.S. PATENT DOCUMENTS

| | | |
|---|---|---|
| 2010/0291943 A1 | 11/2010 | Mihaly et al. |
| 2012/0250584 A1* | 10/2012 | Jayaraman ............ H04L 63/304 370/259 |
| 2014/0010228 A1 | 1/2014 | Maione et al. |

* cited by examiner

FIG. 1: Title

FIG. 2: Title

FIG. 3

FIG. 4: Example Computer System

NETWORK RESOURCE OPTIMIZATION FOR CONTINUITY OF LAWFUL INTERCEPTION OF VOICE AND DATA SESSIONS ACROSS NETWORKS

PRIORITY CLAIM

This U.S. patent application claims priority under 35 U.S.C. § 119 to India Application No. 3069/CHE/2015, filed Jun. 19, 2015. The entire contents of the aforementioned application are incorporated herein by reference.

TECHNICAL FIELD

This disclosure relates generally to lawful interception across heterogeneous communication networks, and more particularly to Network resource optimization for continuity of Lawful Interception of voice and data sessions across networks.

BACKGROUND

Typically, heterogeneous networks may be increasingly deployed around the world to offload traffic to address capacity and coverage issues. Technologies such as IP Flow Mobility and Seamless Offload IFOM (3GPP TS 23.261) may enable seamless mobility or transfer of IP data flows from one network to another. Data offloading or transfer of data flows may happen at the radio access network level (e.g., LTE to Wi Fi or Small Cell), or to avoid passing via the core network components (e.g., LIPA, SIPTO—refer 3GPP TR 23.829)

During Lawful Interception (LI) network resources may not be utilized in an optimal manner due to non-optimal selection of session continuity server as well as content duplication element. Non-optimal selection of content duplication elements may lead to content duplication may occur at multiple network elements of the same communication network or across the communication networks for a Law Enforcement Agency for the same user session. Content duplication at multiple network elements of the same communication network or across the communication networks to redundant LI media content duplication for the same user session.

SUMMARY

In one embodiment, a method to perform continuous lawful interception of an ongoing voice and data session across one or more communication networks, the method comprising: determining a content duplication element associated with a source communication network and one or more communication network properties associated with the source communication network; Initiating duplication of one or more first data packets associated with the ongoing voice and data session by the content duplication element; detecting, a handover of the ongoing data session from the source communication network to a destination communication network; determining the content duplication element associated with the destination communication network and one or more communication network properties associated with the destination communication network; and Initiating, duplication of one or more second data packets associated with the ongoing voice and data session by the content duplication element.

A session continuity server controller to enable continuous lawful interception of an ongoing voice and data session across one or more communication networks comprising: a memory; a processor coupled to the memory storing processor executable instructions which when executed by the processor causes the processor to perform operations comprising: determining an appropriate session continuity server, a content duplication element associated with a source communication network and one or more communication network properties associated with the source communication network; initiating duplication of one or more first data packets associated with the ongoing voice and data session by the content duplication element; detecting, a handover of the ongoing data session from the source communication network to a destination communication network; determining the appropriate content duplication element associated with the destination communication network and one or more communication network properties associated with the destination communication network; and initiating duplication of one or more second data packets associated with the ongoing voice and data session by the content duplication element.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
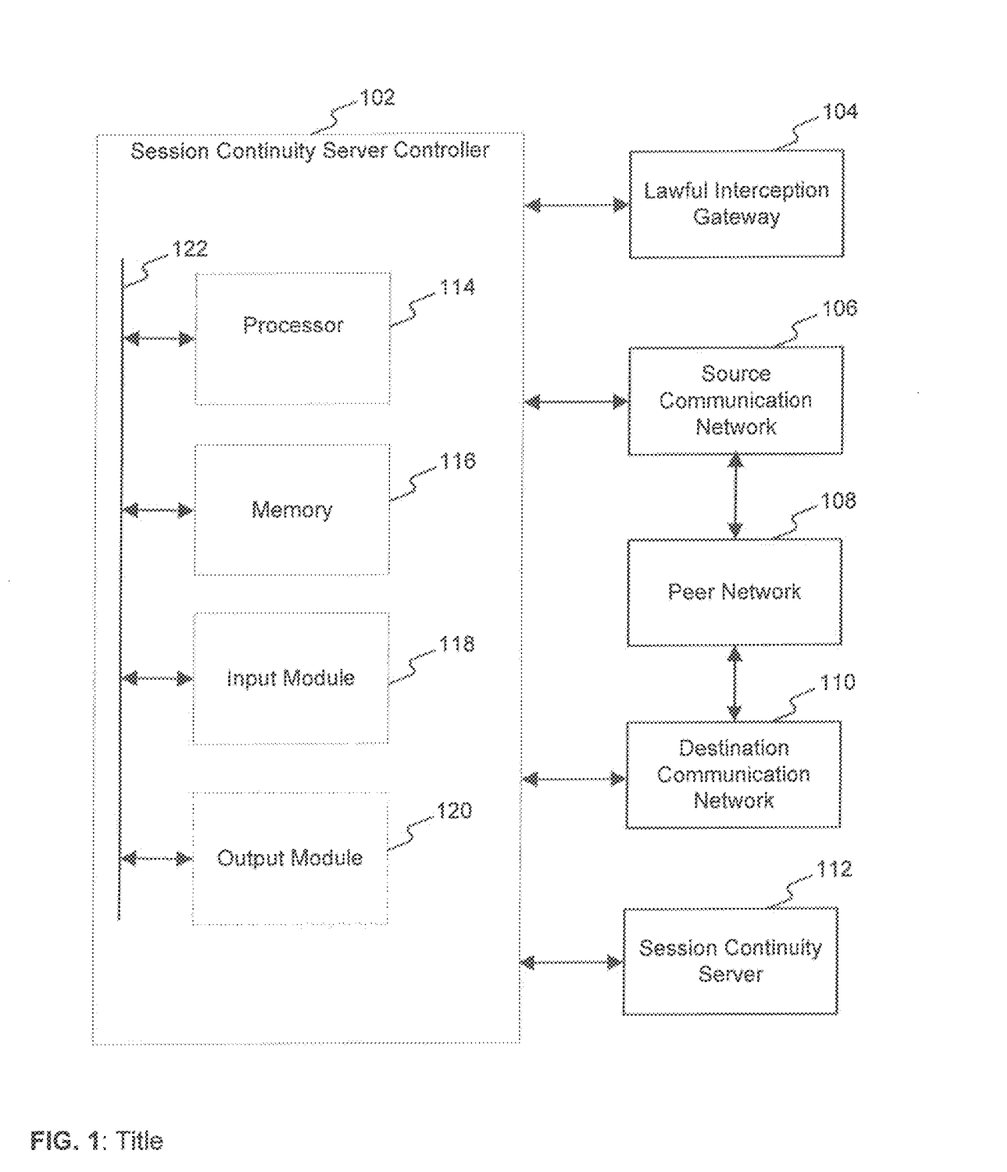
FIG. 1 illustrates an exemplary block diagram for an environment 100 for Lawful Interception in which various embodiments of the present disclosure may function.

FIG. 1 illustrates an exemplary block diagram for an environment 100 for Lawful Interception in which various embodiments of the present disclosure may function. The exemplary environment 100 may include a session continuity server controller (SCSC) 102, a lawful interception gateway 104, a source communication network 106, a peer network 108, a destination communication network 110 and an appropriate session continuity server (SCS) 112. While not shown, the exemplary environment 100 may include additional components, such as database etc which are well known to those of ordinary skill in the art and thus will not be described here. The SCSC 102 may initiate continuous lawful interception of an ongoing voice and data session across one or more communication networks by the appropriate session continuity server 112 ensuring optimal use of network resources. The appropriate session continuity server (SCS) 112 may be a session continuity server which ensures optimal use of network resources during continuous lawful interception of an ongoing voice and data session across one or more communication networks The session continuity server controller (SCSC) 102 may further include at least one processor 114, a memory 116, an input module 118, and an output module 120, which may be coupled together by bus 122. The input module 118 may receive routing policies provisioned by a law enforcement agency and one or more communication network properties. The output module 120, may link the SCSC 102 with peripheral network components such as appropriate session continuity server (SCS) 112, lawful interception gateway (LIG) 104, the source communication network 106 and the destination communication network.

Processor(s) 114 may execute one or more computer-executable instructions stored in the memory 116 for the methods illustrated and described with reference to the examples herein, although the processor(s) can execute other types and numbers of instructions and perform other types and numbers of operations. The processor(s) 114 may comprise one or more central processing units ("CPUs") or general purpose processors with one or more processing cores, such as AMD® processor(s), although other types of processor(s) could be used (e.g., Intel®).

The memory 116 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. The memory 116 may store one or more non-transitory computer-readable instructions of this technology as illustrated and described with reference to the examples herein that may be executed by the one or more processor(s) 114.

Figure 2:
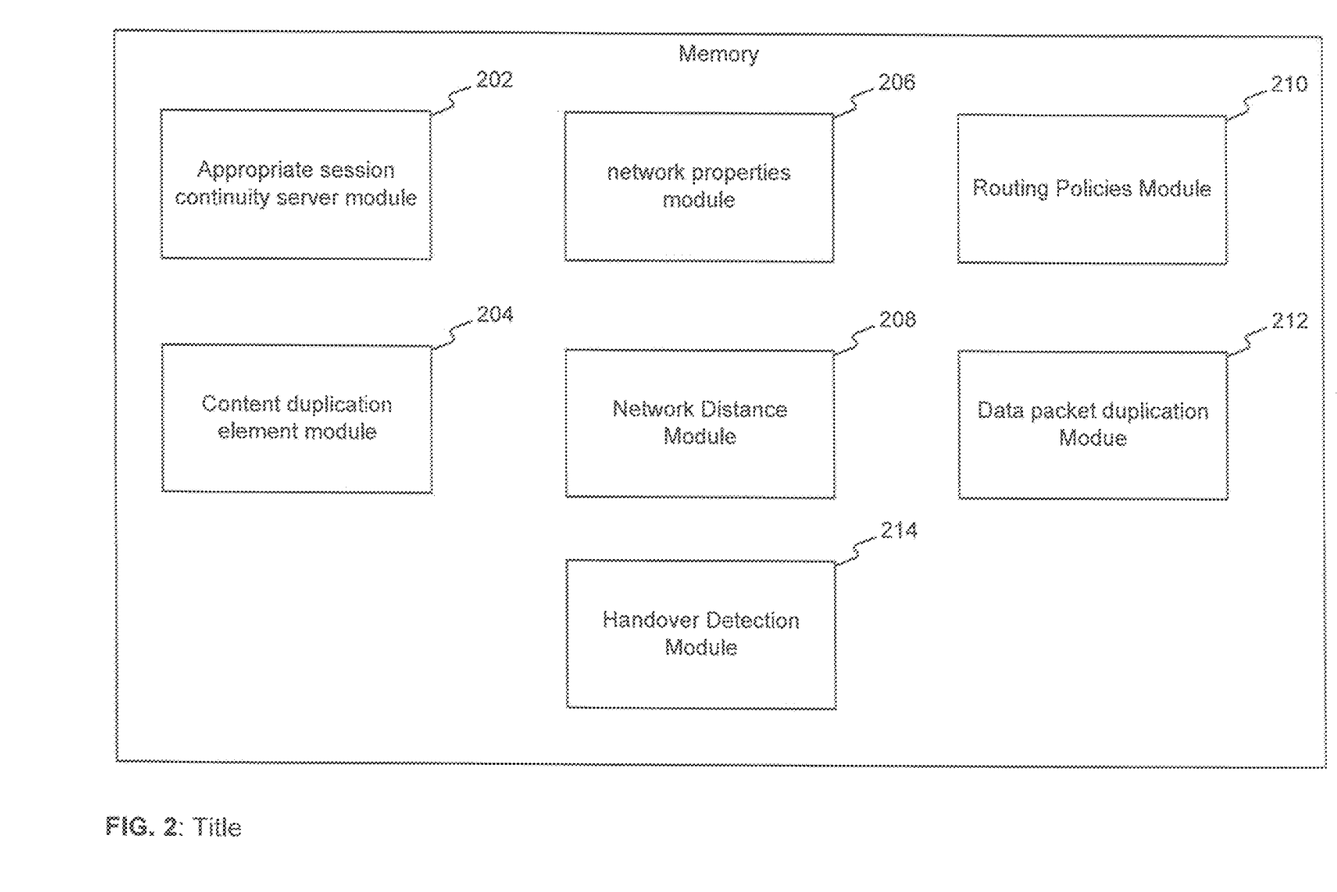
FIG. 2 illustrates the memory of session continuity server controller which may include appropriate session continuity server module, content duplication element module, network properties module, network distance module, routing policies module data packet duplication module and handover detection module.

FIG. 2 illustrates the memory 116 which may include appropriate session continuity server module 202, content duplication element module 204, network properties module 206, network distance module 208, routing policies module 210 data packet duplication module 212 and handover detection module 214. The SCSC 102 to ensure optimal use of network resources may determine an appropriate session continuity server, a content duplication element associated with a source communication network 106 and one or more communication network properties associated with the source communication network 106.

The network properties module 206 may determine one or more communication network properties associated with the source communication network 106. The one or more communication network properties may be characteristics of the ongoing voice and data session, the content duplication function (CDF), and congestion value associated with the one or more communication networks. The CDF may cause content of the ongoing voice and data session to be duplicated and passed to the LEA. The characteristics of the ongoing voice and data session may comprise technologies associated the ongoing voice and data session with such as IP Flow Mobility and Seamless Offload IFOM (3GPP TS 23.261), Voice over LTE (VoLTE) etc. The congestion value associated with the one or more communication networks may be an increase in data transmissions results in a proportionately smaller (or even a reduction in) throughput.

After determination of one or more one or more communication network properties associated with the source communication network 106, the SCSC 102 may determine the content duplication element associated with the source communication network 106. The content duplication element associated with the source communication network 106 may comprise a network element where a content duplication function is performed such as a connection point, a redistribution point, a communication endpoint, physical network node. The content duplication element module 204 may determine the content duplication element (from one or more network elements capable of performing the content duplication function) associated with the source communication network 106 based on a plurality of routing policies provisioned by the law enforcement agency, a threshold congestion value associated with the one or more communication networks, predefined weight factor and distances of the network elements capable of performing content duplication function from a target user. The routing policies module 210, may determine the plurality of routing policies provisioned by the law enforcement agency LEA. One or more network elements capable of performing content duplication function associated with the source communication network 106 may be shortlisted on based on the plurality of routing policies provisioned by the law enforcement agency. Then the shortlisted one or more network elements may be selected based on the threshold congestion value associated with the one or more communication networks. The threshold congestion value may be the congestion value beyond which data packet drops, retransmissions, and associated delays may occur leading to incomplete or defective content duplication. The one or more network elements may also be shortlisted based on processing capacity. Then the selected one or more network elements may be ranked in increasing order according to the distance from the target user. The network distance module 208 may determine the distance of the selected one or more network elements from the target user. Then the content duplication element module 204 may assign a predefined weight factor to each of the ranked one or more network element based on requirement during LI. After assignment of the predefined weight factor the content duplication element module 208 may determine the highest ranked network element as the content duplication element associated with the source communication network 106.

After determining the content duplication element associated with the source communication network 106, the SCSC 102 may determine the appropriate session continuity server 112 from a plurality of session continuity servers based on a plurality of routing policies provisioned by the law enforcement agency, distance from the content duplication element associated with the source communication network 106 and threshold congestion value associated with the one or more communication networks. The routing policies module 210, may determine the plurality of routing policies provisioned by the law enforcement agency LEA. The appropriate session continuity server module 202 may shortlist the plurality of session continuity servers based on the plurality of routing policies provisioned by the law enforcement agency. Then the shortlisted plurality of session continuity servers may be ranked according to distance from the content duplication element associated with the source communication network 106. The session continuity server nearest to the content duplication element may be ranked at the top. The network distance module 208 may determine the distance of the shortlisted plurality of session continuity servers from the content duplication element associated with the source communication network 106. After ranking the plurality of session continuity server according the distance, the appropriate session continuity server may be highest ranked session continuity server based on the threshold congestion value associated with the one or more communication networks. The appropriate session continuity server may also be shortlisted based on processing capacity. The threshold congestion value may be the congestion value beyond which data packet drops, retransmissions, and associated delays may occur leading to incomplete or defective content duplication.

After determining an appropriate session continuity server 112, the content duplication element associated with a source communication network 106 and the one or more communication network properties associated with the source communication network 106, the SCSC 102 may, together with the appropriate session continuity server 112 initiate duplication of one or more first data packets associated with the ongoing voice and data session by the content duplication element. The one or more first data packets associated with the ongoing voice and data session may be at least one of signaling and media content. The ongoing voice and data session may be initiated by the target user with a peer-user who may be present in the source communication network 106 or in a peer communication network 108. The data packet duplication module 212 may trigger duplication of one or more first data packets associated with the ongoing voice and data session by the appropriate session continuity server 112. The appropriate session continuity server 112 may send the content duplication function for the ongoing voice and data session to the content duplication element associated with the source communication network 106. Based on the content duplication function, the content duplication element associated with the source communication network 106 may send the one or more second data packets associated with the ongoing voice and data session from the target user to the appropriate session continuity server 112.

The SCSC 102 may detect a handover of the ongoing voice and data session from the source communication network 106 to a destination communication network 110 from an indication provided by the source communication network 106 via the appropriate session continuity server 112. The handover may be due to reasons such as movement of the target user, offloading policy of the source communication network 106, changes in conditions of the source communication network 106. The handover detection module 214 may detect the handover of the ongoing voice and data session. Upon the handover of the ongoing voice and data session the source communication network 106 contacts the SCSC 102 to obtain instructions regarding continuation of LI post the handover of the ongoing voice and data session. The source communication network 106 may also send the identity of the destination communication network 110 to the appropriate session continuity server 112.

Upon receiving the identity of the destination communication network 110 from the appropriate session continuity server 112, the SCSC 102 may determine the content duplication element associated with the destination communication network 110 and one or more communication network properties associated with the destination communication network 110.

The one or more communication network properties associated with the destination communication network 110 may be characteristics of the ongoing voice and data session, the content duplication function (CDF), congestion value associated with the one or more communication networks. The CDF may cause content of the ongoing voice and data session to be duplicated and passed to the LEA. The characteristics of the ongoing voice and data session may comprise technologies associated the ongoing voice and data session with such as IP Flow Mobility and Seamless Offload IFOM (3GPP TS 23.261), Voice over LTE (VoLTE) etc. The congestion value associated with the one or more communication networks may be an increase in data transmissions results in a proportionately smaller (or even a reduction in) throughput.

After determination of one or more one or more communication network properties associated with the destination communication network 110, the SCSC 102 may determine the content duplication element associated with the destination communication network 110. The content duplication element associated with the destination communication network 110 may comprise a network element where a content duplication function is performed such as a connection point, a redistribution point, a communication endpoint, physical network node. The content duplication element module 204 may determine the content duplication element (from one or more network elements capable of performing the content duplication function) associated with the destination communication network 110 based on a plurality of routing policies provisioned by the law enforcement agency, a threshold congestion value associated with the one or more communication networks, predefined weight factor and distances of the network elements capable of performing content duplication function from the target user. The routing policies module 210, may determine the plurality of routing policies provisioned by the law enforcement agency LEA. One or more network elements capable of performing content duplication function associated with the destination communication network 110 may be shortlisted on based on the plurality of routing policies provisioned by the law enforcement agency. Then the shortlisted one or more network elements may be selected based on the threshold congestion value associated with the one or more communication networks. The threshold congestion value may be the congestion value beyond which data packet drops, retransmissions, and associated delays may occur leading to incomplete or defective content duplication. The one or more network elements may also be shortlisted based on processing capacity. Then the selected one or more network elements may be ranked in increasing order according to the distance from the target user. The network distance module 208 may determine the distance of the selected one or more network elements from the target user. Then the content duplication element module 204 may assign a predefined weight factor to each of the ranked one or more network element based on requirement during LI. After assignment of the predefined weight factor the content duplication element module 208 may determine the highest ranked network element as the content duplication element associated with the destination communication network 110.

The SCSC 102 may thereafter initiate duplication one or more second data packets associated with the ongoing voice and data session from the destination communication network 110 by the appropriate session continuity server 112. The one or more second data packets associated with the ongoing voice and data session may be at least one of signaling and media content. The ongoing voice and data session may be initiated by the target user with a peer-user who may be present in the source communication network 106 or in a peer communication network 108. The data packet duplication module 212 may trigger duplication of one or more second data packets associated with the ongoing voice and data session by the appropriate session continuity server 112. The appropriate session continuity server 112 may send the content duplication function for the ongoing voice and data session to the content duplication element associated with the destination communication network 110. Based on the content duplication function, the content duplication element associated with the destination communication network 110 may send the one or more second data packets associated with the ongoing voice and data session from the target user to the appropriate session continuity server 112.

The appropriate session continuity server 112 may maintain continuity and sequence of the one or more first data packets and the one or more second data packets associated with the ongoing voice and data session. The SCSC 102 may ensure that the one or more first data packets associated with the ongoing voice and data session have been successfully received from the source communication network 106 entirely. The source communication network 106 may send an acknowledgement to the appropriate session continuity server 112 that the one or more first data packets associated with the ongoing voice and data session have been successfully sent to the appropriate session continuity server 112. The acknowledgement may be sent by the source communication network based on one or more notifications associated with completion of sending of all available LI media and signaling content to the appropriate session continuity server 112. The appropriate session continuity server 112 may wait for a pre-configured time duration for the acknowledgement from the source communication network 106. Upon receiving the acknowledgement from the source communication network 106 or on expiry of the pre-configured time duration, if the SCSC 102 determines that one or more first data packets associated with the ongoing voice and data session from the source communication network 106 is missing the SCSC 102 may retrieve such missing data packets from the source communication network 106. Before sending the acknowledgement, the source communication network 106 may retain the one or more first data packets associated with the ongoing voice and data session for a pre-configured time to enable the appropriate session continuity server 112 to retrieve any missing LI information in the one or more first data packets associated with the ongoing voice and data session. The pre-configured time for which the source communication network 106 may retain the one or more first data packets associated with the ongoing voice and data session is typically greater, for e.g., by at least 1-2 minutes than the pre-configured time duration for which the appropriate session continuity server 112 waits for the acknowledgement from the source communication network 106.

Upon maintaining continuity and sequence of the one or more first data packets and the one or more second data packets associated with the ongoing voice and data session, the appropriate session continuity server 112 may deliver the first data packets and the second data packets associated with the ongoing voice and data session as the lawful interception data to the law enforcement agency (LEA). The one or more first data packets and the one or more second data packets associated with the ongoing voice and data session may be delivered to the LEA through a lawful interception gateway LIG.

Figure 3:
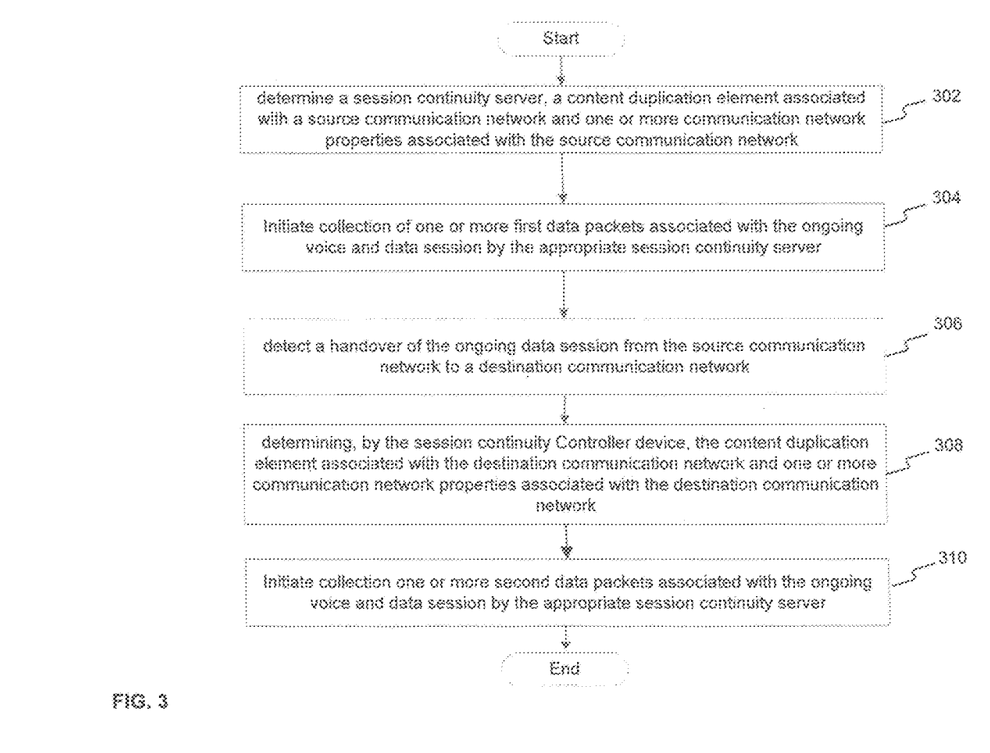
FIG. 3 illustrates an exemplary flow diagram of a method of providing lawful interception continuity across one or more communication networks for an ongoing data session.

FIG. 3 illustrates an exemplary flow diagram of a method of providing lawful interception continuity across one or more communication networks for an ongoing voice and data session. The method may involve determining, by a session continuity server controller (SCSC) 102, an appropriate session continuity server 112, a content duplication element associated with a source communication network 106 and one or more communication network properties associated with the source communication network 106 at step 302. The one or more communication network properties may be characteristics of the ongoing voice and data session, the content duplication function (CDF), congestion value associated with the one or more communication networks. The CDF may cause content of the ongoing voice and data session to be duplicated and passed to the LEA. The characteristics of the ongoing voice and data session may comprise technologies associated the ongoing voice and data session with such as IP Flow Mobility and Seamless Offload IFOM (3GPP TS 23.261), Voice over LTE (VoLTE) etc. The congestion value associated with the one or more communication networks may be an increase in data transmissions results in a proportionately smaller (or even a reduction in) throughput. The one or more communication network properties associated with the source communication network 106 may be determined by the network properties module 206.

After determination of one or more one or more communication network properties associated with the source communication network 106, the content duplication element associated with the source communication network 106 may be determined by the SCSC 102. The content duplication element associated with the source communication network 106 may comprise a network element where a content duplication function is performed such as a connection point, a redistribution point, a communication endpoint, physical network node. The content duplication element associated with the source communication network 106 may be determined from one or more network elements capable of CDF by the content duplication element module 204 based on a plurality of routing policies provisioned by the law enforcement agency, a threshold congestion value associated with the one or more communication networks, predefined weight factor and distance from a target user. The plurality of routing policies provisioned by the law enforcement agency LEA may be determined by the routing policies module 210. One or more network elements associated with the source communication network 106 may be shortlisted on based on the plurality of routing policies provisioned by the law enforcement agency. Then the shortlisted one or more network elements may be selected based on the threshold congestion value associated with the one or more communication networks. The threshold congestion value may be the congestion value beyond which data packet drops, retransmissions, and associated delays may occur leading to incomplete or defective content duplication. The one or more network elements may also be shortlisted based on processing capacity Then the selected one or more network elements may be ranked in increasing order according to the distance from the target user. The distance of the selected one or more network elements from the target user may be determined by the network distance module 208. Then the content duplication element module 204 may assign a predefined weight factor to each of the ranked one or more network element based on requirement during LI. After assignment of the predefined weight factor the content duplication element module 208 may determine the highest ranked network element as the content duplication element associated with the source communication network 106.

After determining the content duplication element associated with the source communication network 106, the appropriate session continuity server 112 from a plurality of session continuity servers may be determined by the SCSC 102. The appropriate session continuity server 112 may be determined by from a plurality of session continuity servers based on a plurality of routing policies provisioned by the law enforcement agency, distance from the content duplication element associated with the source communication network 106 and threshold congestion value associated with the one or more communication networks. The routing policies module 210, may determine the plurality of routing policies provisioned by the law enforcement agency LEA. The appropriate session continuity server module 202 may shortlist the plurality of session continuity servers based on the plurality of routing policies provisioned by the law enforcement agency. Then the shortlisted plurality of session continuity servers may be ranked according to distance from the content duplication element associated with the source communication network 106. The session continuity server nearest to the content duplication element may be ranked at the top. The network distance module 208 may determine the distance of the shortlisted plurality of session continuity servers from the content duplication element associated with the source communication network 106. After ranking the plurality of session continuity server according the distance, the appropriate session continuity server may be highest ranked session continuity server based on the threshold congestion value associated with the one or more communication networks. The threshold congestion value may be the congestion value beyond which data packet drops, retransmissions, and associated delays may occur leading to incomplete or defective content duplication.

After determining the appropriate session continuity server 112, the content duplication element associated with the source communication network. 106 and the one or more communication network properties associated with the source communication network 106, at step 302, the SCSC 102 may initiate duplication of one or more first data packets associated with the ongoing voice and data session by the appropriate session continuity server 112 at step 304. The one or more first data packets associated with the ongoing voice and data session may be at least one of signaling and media content. The ongoing voice and data session may be initiated by the target user with a peer-user who may be present in the source communication network 106 or in a peer communication network 108. The data packet duplication module 212 may trigger duplication of one or more first data packets associated with the ongoing voice and data session by the appropriate session continuity server 112. The appropriate session continuity server 112 may send the content duplication function for the ongoing voice and data session to the content duplication element associated with the source communication network 106. Based on the content duplication function, the content duplication element associated with the source communication network 106 may send the one or more second data packets associated with the ongoing voice and data session from the target user to the appropriate session continuity server 112.

At step 306 the SCSD 102 may detect a handover of the ongoing voice and data session from the source communication network 106 to a destination communication network 110 based on an indication from the source communication network 106. The handover may be due to reasons such as movement of the target user, offloading policy of the source communication network 106, changes in conditions of the source communication network 106. The handover detection module 214 may detect the handover of the ongoing voice and data session. Upon the handover of the ongoing voice and data session the source communication network 106 contacts the SCSD 102 to obtain instructions regarding continuation of LI post the handover of the ongoing voice and data session. The source communication network 106 may also send the identity of the destination communication network 110 to the appropriate session continuity server 112.

Upon receiving the identity of the destination communication network 110 the appropriate session continuity server 112, the SCSC 102 may determine the content duplication element associated with the destination communication network 110 and one or more communication network properties associated with the destination communication network 110 at step 308.

The one or more communication network properties associated with the destination communication network 110 may be characteristics of the ongoing voice and data session, the content duplication function (CDF), congestion value associated with the one or more communication networks. The CDF may cause content of the ongoing voice and data session to be duplicated and passed to the LEA. The characteristics of the ongoing voice and data session may comprise technologies associated the ongoing voice and data session with such as IP Flow Mobility and Seamless Offload IFOM (3GPP TS 23.261), Voice over LTE (VoLTE) etc. The congestion value associated with the one or more communication networks may be an increase in data transmissions results in a proportionately smaller (or even a reduction in) throughput.

The content duplication element associated with the destination communication network 110 may comprise a network element where a content duplication function is performed such as a connection point, a redistribution point, a communication endpoint, physical network node. The content duplication element with the destination communication network 110 may be determined by content duplication element module 204 from one or more network elements capable of performing the content duplication function based on a plurality of routing policies provisioned by the law enforcement agency, threshold congestion value associated with the one or more communication networks, predefined weight factor and distances of the network elements capable of performing content duplication function from the target user.

One or more network elements capable of performing content duplication function associated with the destination communication network 110 may be shortlisted on based on the plurality of routing policies provisioned by the law enforcement agency. The routing policies module 210, may determine the plurality of routing policies provisioned by the law enforcement agency LEA. Then the shortlisted one or more network elements may be selected based on the threshold congestion value associated with the one or more communication networks. The threshold congestion value may be the congestion value beyond which data packet drops, retransmissions, and associated delays may occur leading to incomplete or defective content duplication. The one or more network elements may also be shortlisted based on processing capacity. Then the selected one or more network elements may be ranked in increasing order according to the distance from the target user. The network distance module 208 may determine the distance of the selected one or more network elements from the target user. Each of the ranked one or more network element may be assigned predefined weight factor by the content duplication element module 204 based on requirement during LI. After assigning the predefined weight, the highest ranked network element may be determined as the content duplication element associated with the destination communication network 110 by the content duplication element module 208.

At step 310 the SCSC 102 may initiate duplication one or more second data packets associated with the ongoing voice and data session from the destination communication network 110 by the content duplication element associated with the destination communication network 110. The one or more second data packets associated with the ongoing voice and data session may be at least one of signaling and media content. The ongoing voice and data session may be initiated by the target user with a peer-user who may be present in the source communication network 106 or in a peer communication network 108. The data packet duplication module 212 may trigger duplication of one or more second data packets associated with the ongoing voice and data session by the content duplication element associated with the destination communication network 110. The appropriate session continuity server 112 may send the content duplication function for the ongoing voice and data session to the content duplication element associated with the destination communication network 110. Based on the content duplication function, the content duplication element associated with the destination communication network 110 may send the one or more second data packets associated with the ongoing voice and data session from the target user to the appropriate session continuity server 112.

The appropriate session continuity server 112 may maintain continuity and sequence of the one or more first data packets and the one or more second data packets associated with the ongoing voice and data session. The SCSC 102 may ensure that the one or more first data packets associated with the ongoing voice and data session have been successfully received from the source communication network 106 entirely. The source communication network 106 may send an acknowledgement to the appropriate session continuity server 112 that the one or more first data packets associated with the ongoing voice and data session have been successfully sent to the appropriate session continuity server 112. The acknowledgement may be sent by the source communication network based on one or more notifications associated with completion of sending of all available LI media and signaling content to the appropriate session continuity server 112. The appropriate session continuity server 112 may wait for a pre-configured time duration for the acknowledgement from the source communication network 106. Upon receiving the acknowledgement from the source communication network 106 or on expiry of the pre-configured time duration, if the SCSC 102 determines that one or more first data packets associated with the ongoing voice and data session from the source communication network 106 is missing the SCSC 102 may retrieve such missing data packets from the source communication network 106. Before sending the acknowledgement, the source communication network 106 may retain the one or more first data packets associated with the ongoing voice and data session for a pre-configured time to enable the appropriate session continuity server 112 to retrieve any missing LI information in the one or more first data packets associated with the ongoing voice and data session. The pre-configured time for which the source communication network 106 may retain the one or more first data packets associated with the ongoing voice and data session is typically greater, for e.g., by at least 1-2 minutes than the pre-configured time duration for which the appropriate session continuity server 112 waits for the acknowledgement from the source communication network 106.

Upon maintaining continuity and sequence of the one or more first data packets and the one or more second data packets associated with the ongoing voice and data session, the appropriate session continuity server 112 may deliver the first data packets and the second data packets associated with the ongoing voice and data session as the lawful interception data to the law enforcement agency (LEA). The one or more first data packets and the one or more second data packets associated with the ongoing voice and data session may be delivered to the LEA through the lawful interception gateway LIG.

Computer System

Figure 4:
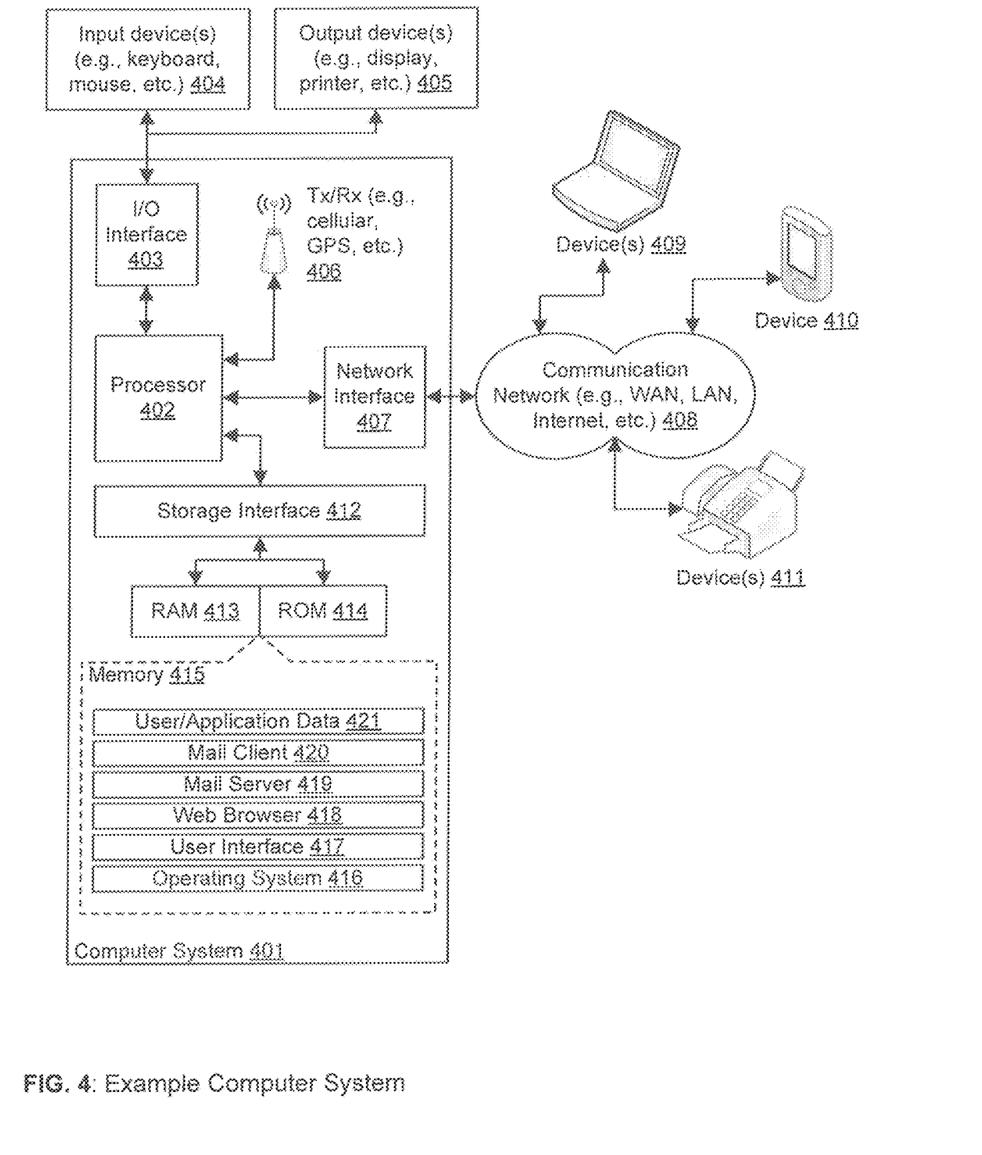
FIG. 4 is a block diagram of an exemplary computer system for implementing embodiments consistent with the present disclosure.

FIG. 4 is a block diagram of an exemplary computer system for implementing embodiments consistent with the present disclosure. Variations of computer system 401 may be used for implementing Session continuity server controller 102, appropriate session continuity sever 112. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a duplication of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described Network resource optimization for continuity of Lawful Interception of voice and data sessions across networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method to enable continuous lawful interception of an ongoing voice and data session across one or more communication networks, the method comprising:
   determining, by a session continuity server controller, an appropriate session continuity server, a content duplication element associated with a source communication network and one or more communication network properties associated with the source communication network;
   initiating, by a session continuity server controller, duplication of one or more first data packets associated with the ongoing voice and data session by the content duplication element;
   detecting, by the session continuity server controller, a handover of the ongoing voice and data session from the source communication network to a destination communication network;
   determining, by the session continuity server controller, the content duplication element associated with the destination communication network and one or more communication network properties associated with the destination communication network, wherein each of the content duplication element associated with the source communication network and the destination communication network is determined from one or more network elements capable of performing content duplication function (CDF) based on a plurality of routing policies provisioned by a law enforcement agency, processing capacity of the one or more network elements capable of performing content duplication function, and threshold congestion value associated with the one or more communication networks; and
   initiating, by the session continuity server controller, duplication of one or more second data packets associated with the ongoing voice and data session by the appropriate session continuity server.

2. The method of claim 1, wherein the appropriate session continuity server is determined from a plurality of session continuity servers based on a plurality of routing policies provisioned by a law enforcement agency, distance from the content duplication element associated with the source communication network, processing capacity of the plurality of session continuity servers, and threshold congestion value associated with the one or more communication networks.

3. The method of claim 1, wherein the content duplication element comprises a network element where a content duplication function is performed, the network element is one of a connection point, a redistribution point, a communication endpoint, physical network node.

4. The method of claim 1, wherein determining each of the content duplication element associated with the source communication network and the destination communication network comprises:
   ranking each of the one or more network elements based on distance from a target user associated with the ongoing voice and data session;
   assigning a predefined weight factor to each of the ranked one or more network elements based on requirement during lawful interception; and
   determining the highest ranked network element as the content duplication element based on the assigned predefined weight factor.

5. The method of claim 1, wherein the source communication network and destination communication network are heterogeneous communication networks.

6. The method of claim 1, wherein the one or more communication network properties comprises characteristics of the ongoing voice and data session, the processing capacity of the one or more network elements capable of performing content duplication function (CDF), and congestion value associated with the one or more communication networks.

7. A session continuity server controller to perform continuous lawful interception of an ongoing voice and data session across one or more communication networks comprising:
   a memory;
   a processor coupled to the memory storing processor executable instructions which when executed by the processor causes the processor to perform operations comprising:
      determining an appropriate session continuity server, a content duplication element associated with a source communication network and one or more communication network properties associated with the source communication network;
      initiating duplication of one or more first data packets associated with the ongoing voice and data session by the content duplication element;
      detecting a handover of the ongoing voice and data session from the source communication network to a destination communication network;
      determining the content duplication element associated with the destination communication network and one or more communication network properties associated with the destination communication network, wherein each of the content duplication element associated with the source communication network and the destination communication network is determined from one or more network elements capable of performing content duplication function (CDF) based on a plurality of routing policies provisioned by a law enforcement agency, processing capacity of the one or more network elements capable of performing content duplication function, and threshold congestion value associated with the one or more communication networks; and
      initiating duplication of one or more second data packets associated with the ongoing voice and data session by the content duplication element.

8. The session continuity server controller of claim 7, wherein the appropriate session continuity server is determined from a plurality of session continuity servers based on a plurality of routing policies provisioned by a law enforcement agency, distance from the content duplication element associated with the source communication network, processing capacity of the plurality of session continuity servers, and threshold congestion value associated with the one or more communication networks.

9. The session continuity server controller of claim 7, wherein the content duplication element comprises a network element where a content duplication function is performed, the network element is one of a connection point, a redistribution point, a communication endpoint, physical network node.

10. The session continuity server controller of claim 7, wherein determining each of the content duplication element associated with the source communication network and the destination communication network comprises:
- ranking each of the one or more network elements based on distance from a target user associated with the ongoing voice and data session;
- assigning a predefined weight factor to each of the ranked one or more network elements based on requirement during lawful interception; and
- determining the highest ranked network element as the content duplication element based on the assigned predefined weight factor.

11. The session continuity server controller of claim 7, wherein the source communication network and destination communication network are heterogeneous communication networks.

12. The session continuity server controller of claim 7, wherein the one or more communication network properties comprises characteristics of the ongoing voice and data session, the processing capacity of the one or more network elements capable of performing content duplication function (CDF), and congestion value associated with the one or more communication networks.

13. A non-transitory computer readable medium including instructions stored thereon that when processed by at least one processor cause a session continuity server controller to perform operations comprising:
- determining, by a session continuity server controller, an appropriate session continuity server, a content duplication element associated with a source communication network and one or more communication network properties associated with the source communication network;
- initiating, by the session continuity server controller, duplication of one or more first data packets associated with the ongoing voice and data session by the appropriate content duplication element;
- detecting, by the session continuity server controller, a handover of the ongoing voice and data session from the source communication network to a destination communication network;
- determining, by the session continuity server controller, the content duplication element associated with the destination communication network and one or more communication network properties associated with the destination communication network, wherein each of the content duplication element associated with the source communication network and the destination communication network is determined from one or more network elements capable of performing content duplication function (CDF) based on a plurality of routing policies provisioned by a law enforcement agency, processing capacity of the one or more network elements capable of performing content duplication function, and threshold congestion value associated with the one or more communication networks; and
- initiating, by the session continuity server controller, duplication of one or more second data packets associated with the ongoing voice and data session by the content duplication element.

14. The medium of claim 13, wherein the appropriate session continuity server is determined from a plurality of session continuity servers based on a plurality of routing policies provisioned by a law enforcement agency, distance from the content duplication element associated with the source communication network, processing capacity of a plurality of session continuity servers, and threshold congestion value associated with the one or more communication networks.

15. The medium of claim 13, wherein the content duplication element comprises a network element where a content duplication function is performed, the network element is one of a connection point, a redistribution point, a communication endpoint, physical network node.

16. The medium of claim 13, wherein determining each of the content duplication element associated with the source communication network and the destination communication network comprises:
- ranking each of the one or more network elements based on distance from a target user associated with the ongoing voice and data session;
- assigning a predefined weight factor to each of the ranked one or more network elements based on requirement during lawful interception; and
- determining the highest ranked network element as the content duplication element based on the assigned predefined weight factor.

17. The medium of claim 13, wherein the source communication network and destination communication network are heterogeneous communication networks.

18. The medium of claim 13, wherein the one or more communication network properties comprises characteristics of the ongoing voice and data session, the processing capacity of the one or more network elements capable of performing the content duplication function (CDF), and congestion value associated with the one or more communication networks.

* * * * *